(12) United States Patent
Steinbrecher et al.

(10) Patent No.: US 9,106,689 B2
(45) Date of Patent: Aug. 11, 2015

(54) INTRUSION DETECTION USING MDL CLUSTERING

(75) Inventors: Eric Steinbrecher, Windsor, NY (US);
Jeremy Impson, Vestal, NY (US);
Bruce Barnett, Troy, NY (US); Scott Charles Evans, Burnt Hills, NY (US);
Bernhard Scholz, Ballston Lake, NY (US); Weizhong Yan, Clifton Park, NY (US); Thomas Markham, Niskayuna, NY (US); Stephen J. Dill, Frederick, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 402 days.

(21) Appl. No.: 13/102,899

(22) Filed: May 6, 2011

(65) Prior Publication Data
US 2012/0284793 A1 Nov. 8, 2012

(51) Int. Cl.
*H04L 29/06* (2006.01)
*G06F 21/55* (2013.01)

(52) U.S. Cl.
CPC .......... *H04L 63/1425* (2013.01); *G06F 21/552* (2013.01); *G06F 21/554* (2013.01); *H04L 63/14* (2013.01); *H04L 63/1408* (2013.01)

(58) Field of Classification Search
CPC . H04L 63/14; H04L 63/1408; H04L 63/1416; H04L 63/1425; H04L 63/1433; G06F 21/552
USPC .......................................................... 726/23
See application file for complete search history.

(56) References Cited

U.S. PATENT DOCUMENTS

| | | |
|---|---|---|
| 5,903,676 A | 5/1999 | Wu et al. |
| 5,956,676 A | 9/1999 | Shinoda |
| 6,189,005 B1 | 2/2001 | Chakrabarti et al. |
| 6,601,048 B1 | 7/2003 | Gavan et al. |
| 6,782,377 B2 | 8/2004 | Agarwal et al. |

(Continued)

FOREIGN PATENT DOCUMENTS

| | | |
|---|---|---|
| JP | 2000112917 | 4/2000 |
| WO | WO 2005/055073 A1 | 6/2005 |

OTHER PUBLICATIONS

Gerhard Munz et al. "Traffic Anomaly Detection Using K-Means Clustering" in Leistungs, Zuverlassigkeitsund Verlassichkeitsbewertung Kommunikationsnetzen and Verteilten Systemen, 4. Gl/itg-Wks. MMBNe. 2007, Hamburg Germany (8 pages) http://www.decom.ufop.br/menotti/rp122/sem/sem3-luciano-art.pdf.*

(Continued)

*Primary Examiner* — Joseph P Hirl
*Assistant Examiner* — Thomas Gyorfi
(74) *Attorney, Agent, or Firm* — Miles & Stockbridge PC; James T. Carmichael

(57) ABSTRACT

An intrusion detection method, system and computer-readable media are disclosed. The system can include a processor programmed to perform computer network intrusion detection. The intrusion detection can include an identification module and a detection module. The identification module can be adapted to perform semi-supervised machine learning to identify key components of a network attack and develop MDL models representing those attack components. The detection module can cluster the MDL models and use the clustered MDL models to classify network activity and detect polymorphic or zero-day attacks.

24 Claims, 11 Drawing Sheets

(56) References Cited

U.S. PATENT DOCUMENTS

| | | | |
|---|---|---|---|
| 6,973,459 | B1 | 12/2005 | Yarmus |
| 7,007,035 | B2 | 2/2006 | Kamath et al. |
| 7,017,186 | B2 | 3/2006 | Day |
| 7,089,592 | B2 | 8/2006 | Adjaoute |
| 7,134,141 | B2 | 11/2006 | Crosbie et al. |
| 7,254,273 | B2 | 8/2007 | Sakanashi et al. |
| 7,260,846 | B2 | 8/2007 | Day |
| 7,313,817 | B2 | 12/2007 | Evans et al. |
| 7,370,357 | B2 | 5/2008 | Sekar |
| 7,409,716 | B2 | 8/2008 | Barnett et al. |
| 7,613,572 | B2 | 11/2009 | Ben-Gal et al. |
| 8,245,301 | B2 | 8/2012 | Evans et al. |
| 8,245,302 | B2 | 8/2012 | Evans et al. |
| 2002/0147754 | A1 | 10/2002 | Dempsey et al. |
| 2003/0061015 | A1 | 3/2003 | Ben-Gal et al. |
| 2004/0157556 | A1 | 8/2004 | Barnett et al. |
| 2004/0250128 | A1 | 12/2004 | Bush et al. |
| 2005/0257269 | A1 | 11/2005 | Chari et al. |
| 2005/0273274 | A1 | 12/2005 | Evans et al. |
| 2005/0275655 | A1 | 12/2005 | Stolze et al. |
| 2006/0070128 | A1 | 3/2006 | Heimerdinger et al. |
| 2006/0212279 | A1 | 9/2006 | Goldberg et al. |
| 2007/0087756 | A1 | 4/2007 | Hoffberg |
| 2008/0016314 | A1 | 1/2008 | Li et al. |
| 2008/0065765 | A1 | 3/2008 | Hild et al. |
| 2008/0222725 | A1 | 9/2008 | Chayes et al. |
| 2008/0222726 | A1 | 9/2008 | Chayes et al. |
| 2008/0291934 | A1 | 11/2008 | Christenson et al. |
| 2009/0021517 | A1 | 1/2009 | Foslien |
| 2009/0138590 | A1 | 5/2009 | Lee et al. |
| 2010/0017870 | A1 | 1/2010 | Kargupta |
| 2010/0071061 | A1 | 3/2010 | Crovella et al. |
| 2010/0082513 | A1 | 4/2010 | Liu |
| 2010/0107253 | A1 | 4/2010 | Eiland et al. |
| 2010/0107254 | A1 | 4/2010 | Eiland et al. |
| 2010/0107255 | A1 | 4/2010 | Eiland et al. |
| 2010/0132039 | A1 | 5/2010 | Ji et al. |
| 2011/0016525 | A1 | 1/2011 | Jeong et al. |
| 2011/0029657 | A1 | 2/2011 | Gueta et al. |
| 2011/0066409 | A1 | 3/2011 | Evans et al. |
| 2011/0067106 | A1 | 3/2011 | Evans et al. |
| 2012/0054866 | A1* | 3/2012 | Evans et al. ............. 726/23 |
| 2012/0284791 | A1* | 11/2012 | Miller et al. ............. 726/22 |

OTHER PUBLICATIONS

Peter Hines et al. "A non-parametric approach to simplicity clustering" Applied Artificial Intelligence 21, No. 8 (2007) (48 pages) http://webcache.googleusercontent.com/search?q=cache:jyGqVSQoTXIJ:www.peterhines.net/downloads/papers/AAI.pdf+&cd=7&hl=en&ct=clnk&gl=us&client=firefox-a.*

Pieter Adriaans et al. "The Power and Perils of MDL" ISIT2007 Nice, France, Jun. 24-29, 2007 (© 2007 IEEE) (5 pages).*

Proceedings of the Fourth IEEE, Computer Science, "An Application of Information Theory to Intrusion Detection", E. Earl Eiland and Lorie M. Liebrock, Ph.D, Apr. 2006, 16 pages.

IEEE Transactions on Pattern Analysis and Machine Intelligence, vol. 21, No. 2 dated Feb. 1999, entitled, "Using Evolutionary Programming and Minimum Description Length Principle for Data Mining of Bayesian Networks", pp. 174-178.

Proceedings of the 28$^{th}$ Hawaii International Conference on System Sciences, 1995 IEEE, "Molecular Evolutionary Phylogenetic Trees Based on Minimum Description Length Principle", Fengrong Ren et al., pp. 165-173.

Axellson S., "The Base-Rate Fallacy and the Difficulty of Intrusion Detection", Transactions on Information and System Security, 2000, 3:3, pp. 186-205.

A. Liu, C. Martin, T. Hetherington and S. Matzner, "A Comparison of System Call Feature Representations for insider Threat Detection", Proceedings of the 2005 IEEE Workshop on Information Assurance and Security United States Military Academy, West Point, NY, 8 pages.

R.A. Maxion and T.N. Townsend, "Masquerade Detection Using Truncated Command Lines", in International Conference on Dependable Systems and Networks (DSN-02), pp. 219-228, Los Alamitos, CA, Jun. 23-26, 2002, IEEE Computer Society Press, Washington, D.C., 10 pages.

R.A. Maxion and T.N. Townsend, "Masquerade Detection Augmented with Error Analysis". IEEE Transactions on Reliability, 53(1): 124-147, Mar. 2004.

M. Schonlau, W. DuMouchel, W. Ju, A. Karr, M. Theus, Y. Vardi, (2001), "Computer Intrusion: Detecting Masquerades", Statistical Science, 2001;16(1), 16 pages.

R.A. Maxion, "Masquerade Detection Using Enriched Command Lines". in International Conference on Dependable Systems and Networks (DSN-03), pp. 5-14, Los Alamitos, CA Jun. 22-25, 2003. IEEE Computer Society Press. San Francisco, CA, 10 pages.

S.C. Evans, B. Barnett, G.J. Saulnier and S.F. Bush, "MDL Principles for Detection and Classification of FTP Exploits,"MILCOM 2004.

S.F. Bush and S.C. Evans, "Information Assurance Design and Assessment: Final Report", General Electric Research and Development Center, Aug. 2002, 84 pages.

S. Goel and Stephen F. Busch, Kolmogorov Complexity Estimates for Detection of Viruses in Biologically Inspired Security Systems: A Comparison with Traditional Approaches, Complexity, 9:2, 2003, 45 pages.

Benedetto, Caglioli and Loreto, "Language Trees and Zipping", Physical Review Letters, 88, 2002. Grunwald, et al. Advances in Minimum Description Length Theory and Applications. MIT Press, 2005, 7 pages.

C. de la Higuera, "A Bibliographical Study of Grammatical Inference", Pattern Recognition vol. 38, pp. 1332-1348, 2005, 40 pages.

S.C. Evans, G.J. Saulnier and S.F. Bush, "A New Universal Two Part Code for Estimation of String Kolomogorov Complexity and Algorithmic Minimum Sufficient Statistic," DIMACS Workshop on Complexity and Inference, 2003, http://www.stat.ucla.edu/-cocteau/dimacs/evans.pdf, e pages.

S.C. Evans, T.S. Markham, A. Torres, A. Kourtidis and D. Conlin, "An Improved Minimum Description Length Learning Algorithm for Nucleotide Sequence Analysis," Proceedings of IEEE 40$^{th}$ Asilomar Conference on Signals, Systems and Computers, Pacific Grove, CA, Nov. 2006.

S.C. Evans, A. Kourtidis, T S. Markham, J Miller, D. Conklin and A. Torres, "MicroRNA Target Detection and Analysis for Genes Related to Breast Cancer Using MDL Compress," EURASIP Jounal on Bioinformatics and Systems Biology, Special Issue on Information Theoretic Methods for Bioinformatics, Sep. 2007, 1 page.

M. Latendresse, "Masquerade Detection via Customized Grammars", Lecture Notes in Computer Science, 3548. 141-159, Jun. 2005, 12 pages.

C.G. Nevill-Manning and I.H. Witten (1997), "Identifying Hierarchical Structure in Sequences in a Linear Time Algorithm," Journal of Artificial Intelligence Research, 7, 67-82.

C.G. Nevill-Manning and I.H. Witten, I.H. http://sequitur.info/. Dept of Computer Science, University of Waikato, Hamilton, New Zealand, May 22, 2007, 1 page.

P. Gacs, J.T. Tromp and P. Vitanyi, "Algorithmic Statistics", IEEE Transactions on Information Theory, vol. 47, No. 6, Sep. 2001, 21 pages.

T.M. Cover and J.A. Thomas, Elements of Information Theory, Wiley, NY 1991—book.

M. Li and P. Vitanyi, "An Introduction to Kolmogorov Complexity and its Applications", Spring, NY 1997.

R. Richardson, CSI Survey 2007: The 12$^{th}$ Annual Computer Crime and Security Survey. 2007, Computer Security Institute: San Francisco, CA, 30 pages.

2007 Threat Report, 2008 Threat and Tech. Forecast. 2008, Trend Micro, Inc. Tokyo, Japan, 32 pages.

T. AbuHmed, A. Mohaisen and D. Nyang, "A Survey on Deep Packet Inspection for Intrusion Detection Systems", Mar. 1, 2008, 10 pages.

I. Zhang and G.B. White, "An Approach to Detect Executable Content for Anomaly Based Network Intrusion Detection", in 21$^{st}$ Internat.l Parallel and Distributed Processing Symp. 2007, IEEE, 8 pages.

(56) References Cited

OTHER PUBLICATIONS

M.Z. Shafiq et al., Extended Thymus Action for Improving Response of AIS based NID System Against Malicious Traffic, in Congress on Evolutionary Computation, 2007. 2007, IEEE., 8 pages.

J.M. Estevez-Tapiador, P. Garcia-Teodoro and J.E. Diaz-Verdejo, Measuring Normality in HTTP Traffic for Anomaly-based Intrusion Detection. Computer Networks, 2004. 45(2), p. 175-193.

K.L. Ingham and A. Somayaji, A Methodology for Designing Accurate Anomaly Detection Systems, in Latin America Networking Conference. 2007, San Jose, CA ACM.

S. Evans et al., Minimum description length principles for detection and classification of FTP exploits, in Military Communications Conference, 2004, MILCOM 2004, IEEE, 2004.

S.C. Evans et al., microRNA Target Detection and Analysis for Genes Related to Breast Cancer Using MDLcompress. EURASIP Journal on Bioinformatics and Systems Biology, 2007. 2007(Special Issue on Information Theoretic Methods for Bioinformatics).

P.D. Grunwald, "A Tutorial Introduction to the Minimum Description Length Principle". 2007, Cambridge, MA: MIT Press. 703.

P. Adriaans and P. Vitanyi, The Power and Perils of MDL, in ISIT 2007. Jun. 29, 2007.Nice, France.

G. Munz, S. Li and G. Carie, "Traffic Anomaly Detection Using k-means Clustering", in Leistungs, Zuverlässigkeitsund Verlässlichkeitsbewertung Kommunikationsnetzen und Verteilten Systemen, 4. Gl/itg-Wks. MMBne. 2007. Hamburg, Germany.

K. Wang and S.J. Stolfo, "Anomalous Payload-based Network Intrusion Detection", Recent Advances in Intrusion Detection SpringerLink, Editor. 2004, Springer:Berlin/Heidelberg, Germany. pp. 203-222.

N. Athanasiades et al. "Intrusion Detection Testing and Benchmarking Methodologies", in Proceedings of the First IEEE International Workshop on Info. Assurance. 2003, Los Alamitos, CA, IEEE, 10 pages.

Staff. MIT Lincoln Laboratory Information Systems Technology [Web site] 2008 [cited May 21, 2008]; Umbrella site for 1999 DARPA Intrusion Detection Evaluation Data Set]. Available from: http://www.ll.mit.edu/mission/communications/ist/corpora/ideval/data/1999data.html.

Staff. Tenable Network Security. [Web page] 2008 [cited May 21, 2008]; Home page for Nessus Vulnerability Tppl]. http://www.nessus.org/nessus/.

J. Elson, topflow—TCP Flowrecorder. [Web page] Aug. 7, 2003 [cited May 22, 2008]; Available from: http://www.circlemud.org/jelson/software/tcpflow/.

S. Wehner, "Analyzing Worms and Network Traffic Using Compression", in arXiv:cs/0504045v1 [cs.CR] Apr. 12, 2005, 12 pages.

R. Duda, P.E. Hart and D.G. Stork, "Pattern Classification"($2^{nd}$) John Wiley and Sons, 2001, book.

GE Research & Lockheed Martin Corporation; "MDLcompress for Intrusion Detection: Signature Inference and Masquerade Attack ", 06/07 IEEE.

Evans et al., Towards Zero-Day Attack Detection through Intelligent Icon Visualization of MDL Model Proximity: Extended Abstract, VizSec2008 Conference Poster (Sep. 15, 2008).

Keogh, E., Wei, L., Xi, X., Lonardi, S., Sirowy, S., "Intelligent Icons: Integrating Lite-Weight Data Mining and Visualization into GUI Operating Systems," ICDM (2006).

Williamson, "Throttling viruses: restricting propagation to defeat malicious mobile code", Computer Security Applications Conference Proceedings (2002).

Evans et al., Network attack visualization and response through intelligent icons, Military Communications Conference (MILCOM) (Oct. 21, 2009).

Ragsdale et al., "Adaptation Techniques for Intrusion Detection and Intrusion Response Systems", 2000 IEEE International Conference on Systems, and Cybernetics (Oct. 8, 2000).

Yang, Peng. Ward, Rundensteiner, "Interactive hierarchical dimension ordering, spacing and filtering for exploration of high dimensional datasets", IEEE Symposium on Information Visualization—INFOVIS 2003, pp. 105-112 (2003).

Edward Tufte, The Visual Display of Quantitative Information, 2 ed., p. 119 (Graphics Press 2001).

Jonah Turner, "Easy as Pie Charts (Any Way You Slice 'Em)", SAS Global Forum, p. 071-2008 (Mar. 16, 2008).

LeRoy Bessler, "Communication-Effective Pie Charts", SAS Global Forum 2007, Paper 134-2007 (2007).

Keim, Kriegal, "Visualization techniques for mining large databases: a comparison", IEEE Transactions on Knowledge and Data Engineering, pp. 923-938 (1996).

Keim, "Designing pixel-oriented visualization techniques: theory and applications", IEEE Transactions on Visualization and Computer Graphics, pp. 59-78 (2000).

Hao, Keim, "Importance-driven visualization layouts for large time series data", IEEE Symposium on Information Visualization—INFOVIS 2005, pp. 203-210 (2005).

Ferreira de Oliveira, Levkowitz, "From visual data exploration to visual data mining: a survey", IEEE Transactions on Visualization and Computer Graphics, pp. 378-394 (2003).

Nonfinal Office Action dated May 7, 2011, in U.S. Appl. No. 12/560,297.

Nonfinal Office Action dated May 6, 2011, in U.S. Appl. No. 12/882,637.

Nonfinal Office Action dated Nov. 2, 2011 in U.S. Appl. No. 12/882,637.

Nonfinal Office Action dated Nov. 7, 2011, in U.S. Appl. No. 12/560,297.

Notice of Allowance dated May 4, 2012, in U.S. Appl. No. 12/560,297.

Notice of Allowance dated May 9, 2012, in U.S. Appl. No. 12/882,637.

\* cited by examiner

INTRUSION DETECTION USING MDL CLUSTERING

This application is directed to an invention/inventions made as a result of activities undertaken within the scope of a Joint Research Agreement made between Lockheed Martin Corporation and the General Electric Company.

Embodiments of the present invention relate generally to methods, systems and computer-readable media for detection of network intrusions, more specifically, to methods and systems for detection of network intrusions using minimum description length (MDL) clustering.

Conventional signature-based intrusion detection systems may be easily defeated by polymorphic or zero day attacks. The present invention was conceived in light of the aforementioned limitation, among other things.

Embodiments include an MDL clustering technique that provides for unsupervised, semi-supervised and supervised machine learning. A clustering engine in an embodiment can include an MDL compress model. The MDL compress model is described in co-pending U.S. patent application Ser. No. 12/260,627, entitled "MDL Compress System and Method for Signature Inference and Masquerade Intrusion Detection" and filed on Oct. 29, 2008; Ser. No. 12/260,682, entitled "Network Intrusion Detection Using MDL Compress for Deep Packet Inspection" and filed on Oct. 29, 2008; and Ser. No. 12/398,432, entitled "Intrusion Detection Using MDL Compression" and filed on Mar. 5, 2009, which are each incorporated herein by reference in their entirety.

An embodiment can include a network intrusion detection system having a processor coupled to a nontransitory computer readable medium bearing software instructions that, when executed by the processor, cause the processor to perform a series of operations. The operations can include clustering network traffic files into a plurality of clusters based on minimum description length (MDL) similarity; building an MDL model for each cluster; and calculating distances from each traffic file to each MDL model to obtain a distance vector for each traffic file, each distance vector having a distance from a corresponding traffic file to each MDL model. The operations can also include building a decision model based on the distance vectors; analyzing network traffic using the decision model; and generating an output based on the analyzing, the output indicating potential matches between network traffic and an MDL model corresponding to malicious activity.

Another embodiment includes a computerized method for computer network intrusion detection. The method can include clustering, with a processor programmed to perform network intrusion detection, network traffic files into a plurality of clusters based on minimum description length (MDL) similarity, and building, with the processor, an MDL model for each cluster. The method can also include calculating, with the processor, distances from each traffic file to each MDL model to obtain a distance vector for each traffic file, each distance vector having a distance from a corresponding traffic file to each MDL model; and building, with the processor, a decision model based on the distance vectors.

Yet another embodiment can include a nontransitory computer-readable medium having software instructions stored thereon that, when executed by a processor, cause the processor to perform operations. The operations can include clustering network traffic files into a plurality of clusters based on minimum description length (MDL) similarity; building an MDL model for each cluster; and calculating distances from each traffic file to each MDL model to obtain a distance vector for each traffic file, each distance vector having a distance from a corresponding traffic file to each MDL model. The operations can also include building a decision model based on the distance vectors.

DETAILED DESCRIPTION

Figure 1:
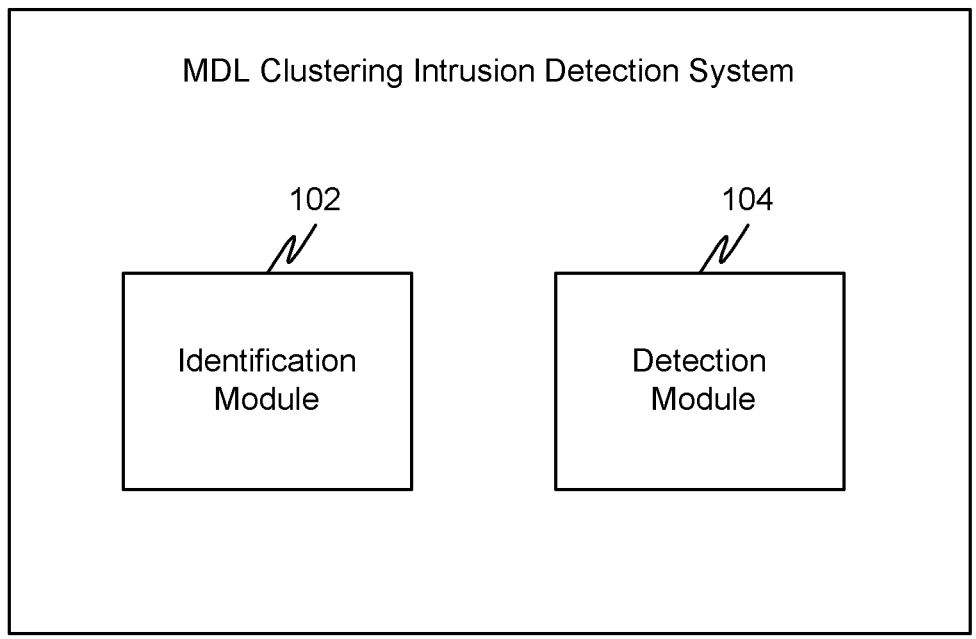
FIG. 1 is diagram of an exemplary intrusion detection system in accordance with the present disclosure.

FIG. 1 is diagram of an exemplary intrusion detection system in accordance with the present disclosure. In particular, an MDL clustering intrusion detection system 100 includes an identification module 102 and a detection module 104.

The identification module 102 is adapted to analyze malicious (or attack) network behavior (or traffic) to identify key components of an attack and to determine an MDL soft learning model of the key attack components.

The detection module 104 analyzes network traffic and employs the MDL learning model developed by the identification module 102 to detect and, optionally, to stop network traffic that has components or characteristics in common with one or more of the MDL models corresponding to malicious or attack behavior. The detection module 104 can also be adapted to recognize transformations in key components of an attack, learn those transformations and include new network behaviors associated with those transformations in the MDL models. The learning feature can provide the system with the ability to stop polymorphic attacks and to classify network behavior based on similarity to known attacks or behaviors. Also, the learning feature can include an unsupervised learning component and a supervised or semi-supervised learning component, as described in greater detail below in connection with FIG. 4.

Figure 2:
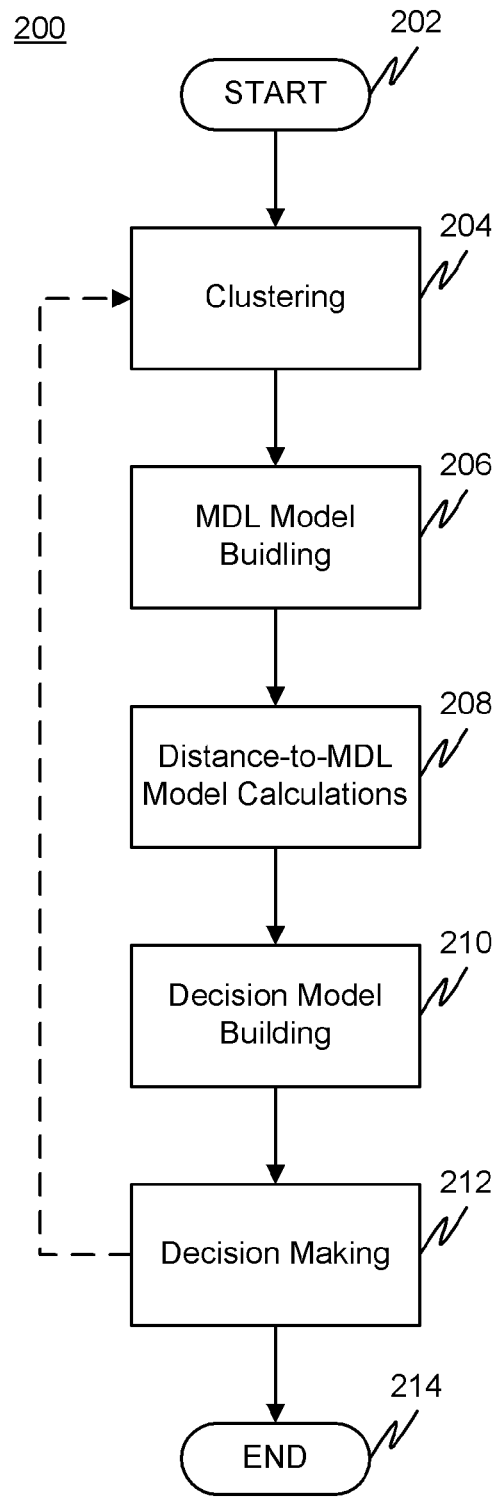
FIG. 2 is a chart of an exemplary intrusion detection method in accordance with the present disclosure.

FIG. 2 is a chart of an exemplary intrusion detection method 200 in accordance with the present disclosure. Processing begins at 202 and continues to 204.

At 204, clustering is performed. In clustering, traffic files (e.g., a training set of network traffic files) are grouped into clusters based on MDL similarity. The traffic files can represent normal traffic, malicious traffic or both. Processing continues to 206.

At 206, MDL models of the cluster are built. The MDL models for a cluster can be built, for example, by concatenating all files in the cluster into a single string. Processing continues to 208.

At 208, distances to the MDL models are calculated for each file, resulting in a vector for each traffic file. Each vector includes a distance to each MDL model from the corresponding file. Processing continues to 210.

At 210, a decision making model is built. By treating distance vectors as instances and elements of the vectors as variables (or features), a decision making model can be built.

The decision making model can be a minimum distance model, a support vector machine, or the like. A support vector machine (SVM) is a set of related supervised learning methods for analyzing data and recognizing patterns. SVMs can be used for classification and regression analysis. Typically, an SVM takes a set of input data and predicts, for each given input, which one of two possible classes (or groups) the input is a member of. Thus, SVMs can be used as non-probabilistic binary linear classifiers. Processing continues to 212.

At 212, the decision model is used to make decisions regarding traffic flowing in a network. Processing continues to 214, where processing ends. Optionally, processing can continue from 212 to 204 in order to perform an intrusion detection task.

Figure 3:
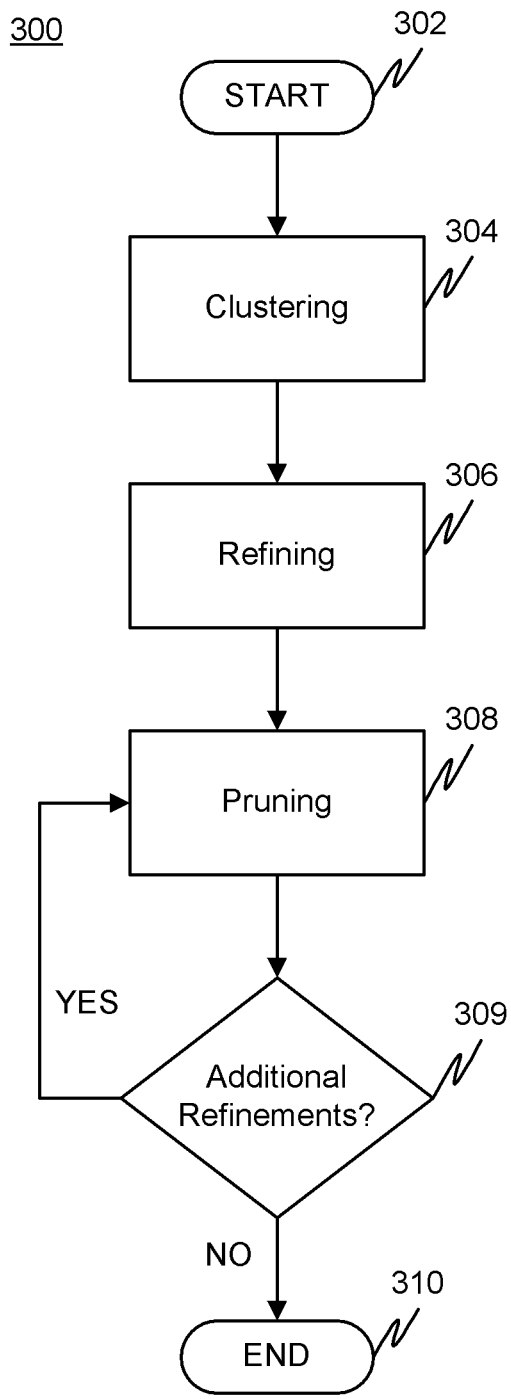
FIG. 3 is a chart showing an exemplary clustering method in accordance with the present disclosure.

FIG. 3 is a chart showing an exemplary clustering method 300 in accordance with the present disclosure. Processing begins at 302 and continues to 304.

At 304, traffic files (e.g., training files containing network traffic) or data primitives are clustered using MDL-based clustering. In MDL-based clustering, a pair-wise similarity matrix is generated using MDL to calculate a distance (or similarity) between pairs of traffic files. Hierarchical clustering is applied to the similarity matrix. The hierarchical clustering output can be visualized as a dendrogram showing how the traffic files or data samples have been grouped into clusters (dendrograms are discussed in greater detail below in connection with FIG. 6). In order to handle large data sets, clusters can initially be formed using a subset of data and these clusters can then be applied to a larger, remaining set of data in order to group an entire large data set into clusters. An example of a clustering method is shown below:

---
Parallel Clustering
---
Input: File Set
Output: Model Set
Divide file set into N groups;
foreach group of files do
    Calculate the pairwise distances between files using MDLCompress;
    Perform hierarchical clustering based on distances;
    foreach hierarchical cluster do
        Build MDL using MDLCompress on most central files;
    end
    Refine MDL cluster → clusterSet$_i$;
end
while length (clusterSet) > 1 do
    foreach pair of cluster sets do
        newClusterSet$_j$ ← distillClusters ( clusterSet$_1$, clusterSet$_2$ );
    end
    clusterSet ← newClusterSet;
    if not every file belongs to cluster then
        leftovers ← files not belonging to any cluster;
        leftOverClusterSet ← ParallelClustering( leftovers );
        clusterSet ← distillClusters(clusterSet$_1$, leftOverClusterSet);
    end
end
---

Processing continues to 306.

At 306, the clusters are refined (or distilled). Refining can be needed because, as models change, clusters may move between cluster partitions. An example of a refining or distilling method is shown below:

---
Distill Clusters
---
Input: ClusterSet$_1$, ClusterSet$_2$, FileSet
Output: CombinedClusterSet
newClusterSet ← ClusterSet$_1$ ClusterSet$_2$
while oldDataCost + oldModelCost > newDataCost + newModelCost do
    CombinedClusterSet ← newClusterSet;
    newClusterSet ← RefineClusters ( CombinedClusterSet );

---
Distill Clusters
---
    Get distance of each file to each cluster;
    if oldDataCost + oldModelCost > newDataCost + newModelCost
    then
        CombinedClusterSet ← newClusterSet;
    end
    newClusterSet ← PruneClusters ( CombinedClusterSet );
    Get distance of each file to each cluster;
end
---

Processing continues to 308.

At 308, the clusters are pruned. Pruning can include removing clusters that are providing the least amount of MDL benefit (e.g., the least compression). An example of a pruning method is shown below:

---
Prune Clusters
---
Input: ClusterSet, FileSet
Output: PrunedClusterSet
foreach Cluster$_i$ in ClusterSet do
    foreach File$_j$ in FileSet do
        distance$_{ij}$ ← distancefromFile$_j$ to Cluster$_i$;
    end
end
distanceToNearestCluster$_j$ ← min ( distance$_j$ );
foreach Cluster$_i$ in ClusterSet do
    prunedDistance$_{ij}$ ← min ( distance$_x$j , x ≠ i);
    prunedCost$_i$ ← sum( prunedDistance – distance$_{ij}$);
end
if any clusters exist where prunedCost < clusterCost then
    Remove cluster which minimizes prunedCost – clusterCost
end
---

Processing continues to 309. At 309, it is determined whether additional refinements decrease the MDL cost of the model. If so, processing returns to 306. If not, processing continues to 310, where processing ends. It will be appreciated that 304-308 can be repeated in whole or in part in order to accomplish a contemplated clustering process.

Figure 4:
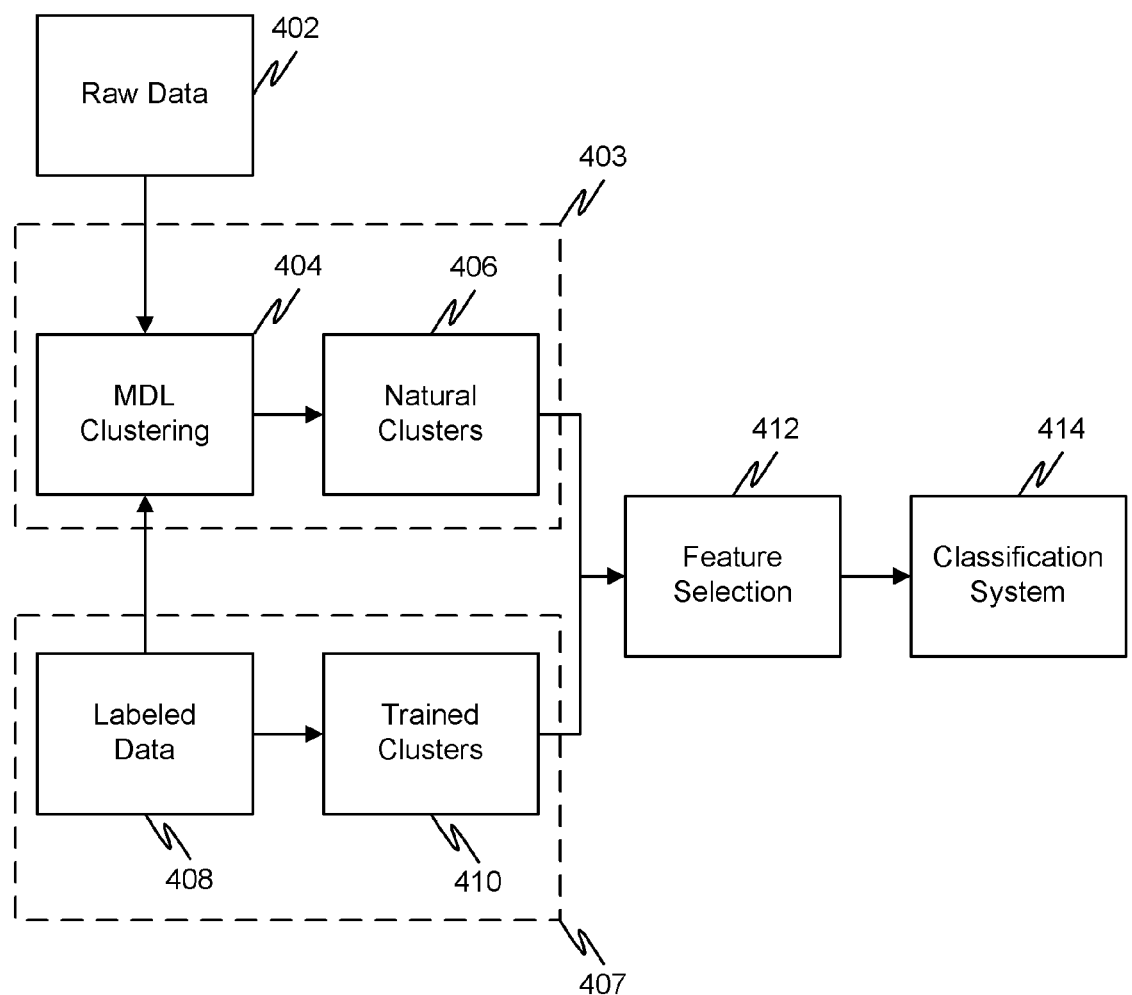
FIG. 4 is a diagram of an exemplary learning system in accordance with the present disclosure.

FIG. 4 is a diagram of an exemplary learning system in accordance with the present disclosure. In particular, a system 400 includes raw data files 402, a semi-supervised learning section 403 (having an MDL clustering module 404 and natural cluster data 406), a supervised learning section 407 (having labeled data 408 and trained clusters 410), a feature selection module 412 and a classification system 414.

In operation, the raw data files 402 (e.g., network traffic data files) are supplied to the MDL clustering module 404, which performs a clustering operation (e.g., similar to that discussed above in connection with FIG. 3) in a semi-supervised learning mode. The natural clusters 406 are outputted by the MDL clustering module 404. The MDL clustering module 404 and the resulting natural clusters 406 form an unsupervised (or semi-supervised) learning section 403 of the system.

Labeled data 408 is supplied to the MDL clustering module 404 and is organized into trained clusters 410. The labeled data 408 and the trained clusters 410 form a supervised or semi-supervised learning section 407 of the system. The labeled data 408 may be labeled by a person, by a machine or by a combination of the two.

The natural clusters 406 and the trained clusters 410 are supplied to the feature selection module 412, which selects features for use in classification of network traffic. Selected features of network traffic are supplied from the feature selection module 412 to the classification system 414 in order to classify network traffic as normal traffic or as malicious/attack traffic.

Figure 5:
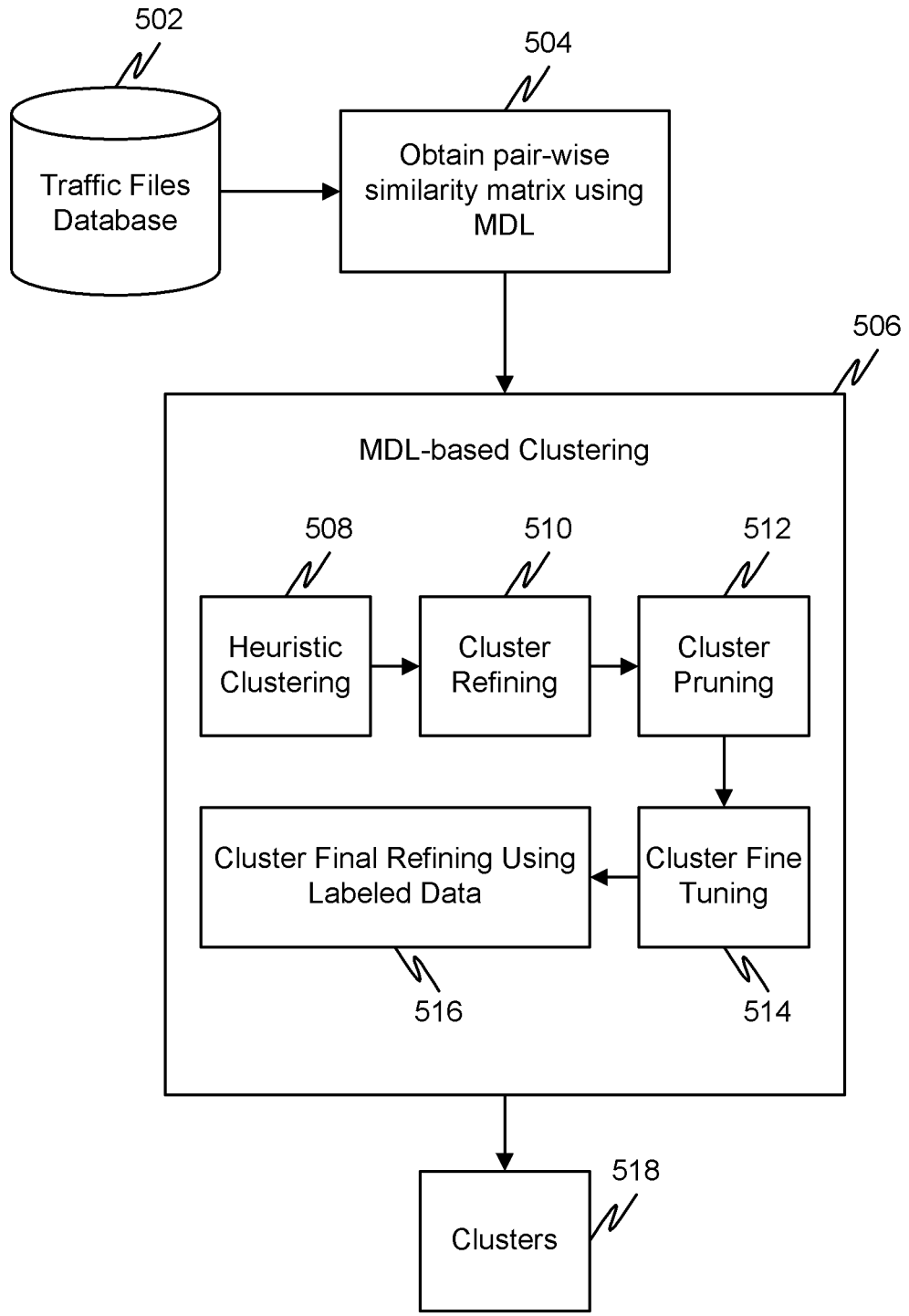
FIG. 5 is a diagram of an exemplary clustering system in accordance with the present disclosure.

FIG. 5 is a diagram of an exemplary clustering system in accordance with the present disclosure. In particular, a system 500 includes a database of traffic files 502 coupled to a processor that is programmed to provide a module for determining a pair-wise similarity matrix using MDL models 504. The processor can also include an MDL-based clustering module 506.

The MDL-based clustering module can be adapted to perform heuristic clustering (508), cluster refining (510) and cluster pruning (512). The MDL-based clustering module can also be adapted to perform cluster fine tuning (514) and final cluster refining using labeled data (516). As output, the MDL-based clustering module 506 provides clusters 518. The clusters 518 can be used by a classifier to classify network traffic as normal traffic or attack/intrusion traffic.

Figure 6:
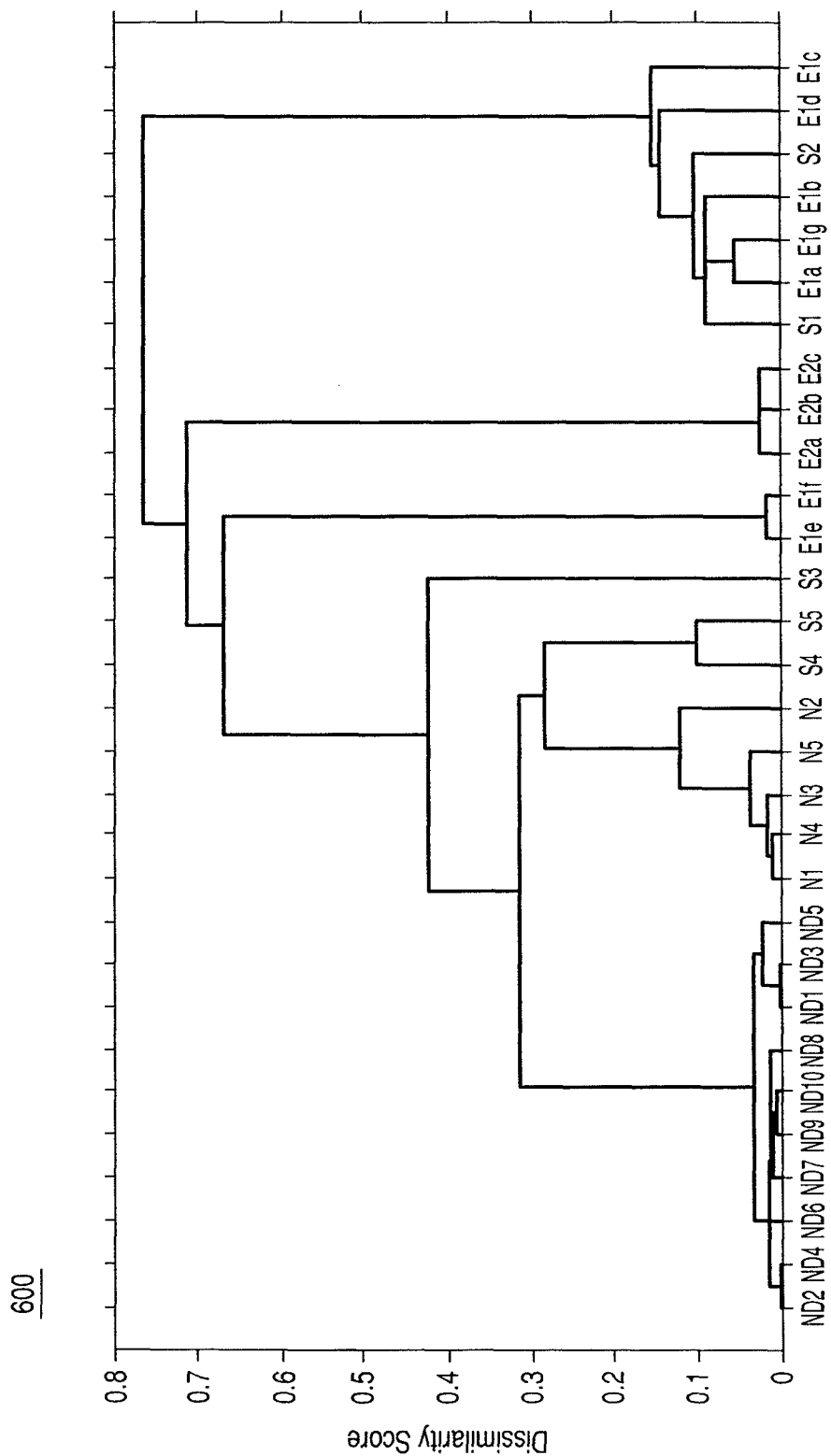
FIG. 6 shows an exemplary dendrogram in accordance with the present disclosure.

FIG. 6 shows an exemplary dendrogram in accordance with the present disclosure. The dendrogram provides a visual representation of cluster data correlation. The traffic files are arranged along the bottom of the dendrogram (referred to as leaf nodes). Clusters are formed by joining individual files or existing file clusters with the join point referred to as a node. Each dendrogram node has a right and left sub-branch of clustered files. The vertical axis is labeled dissimilarity score and refers to a distance measure between files or file clusters. The height of the node can be thought of as the distance value between the right and left sub-branch clusters. The distance measure between two clusters can be calculated as follows: D=1−C, where D=Distance and C=correlation between file clusters.

If files are highly correlated, they will have a correlation value close to 1 and so D=1−C will have a value close to zero. Therefore, highly correlated clusters are nearer the bottom of the dendrogram. File clusters that are not correlated have a correlation value of zero and a corresponding distance value of 1. Files that are negatively correlated, i.e. showing opposite expression behavior, will have a correlation value of −1 (e.g., D=1−−1=2).

Figure 7:
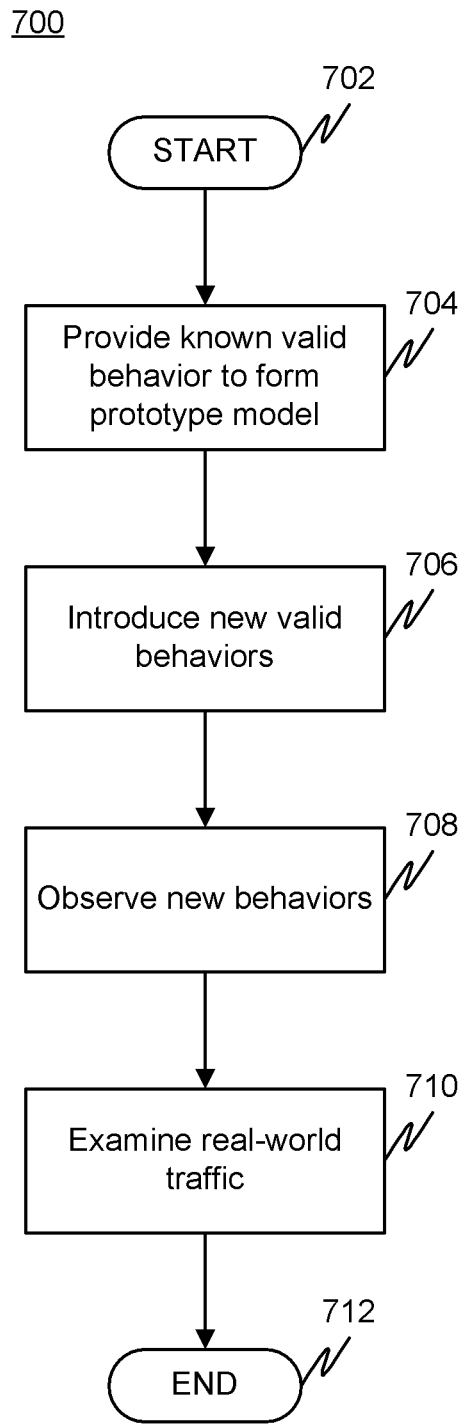
FIG. 7 is a chart of an exemplary learning method in accordance with the present disclosure.

FIG. 7 is a chart of an exemplary learning method 700 in accordance with the present disclosure. Processing begins at 702 and continues to 704.

At 704, data corresponding to known valid and trusted network behavior is provided and is used to generate a prototype model. The known valid network data may be artificially generated to ensure all actions are known proper. Processing continues to 706.

At 706, new valid behavior data can be introduced into the system. Initially the new behavior data may cluster to form one or more new models. Elements common to all new models, yet different from the first models may indicate noise elements, which can provide opportunities to introduce filters or pre-processors to remove these common elements. By applying these filters or pre-processors to the prototype model, a tighter cluster of behaviors may be obtained. Processing continues to 708.

At 708, new behaviors are observed by the system. Some of these new behaviors can be borderline or exploit behaviors, e.g., protocol fuzzers, vulnerability scanners and exploitation frameworks can be presented to the system and observed. Some of these actions (e.g., protocol fuzzers) may fall into a previous cluster of safe behavior, while others can be categorized appropriately (e.g., exploit attempts, information gathering, borderline behaviors or the like). Processing continues to 710.

At 710, real world traffic is examined by the system. Categorizing attack traffic as normal would create false negatives, while categorizing normal traffic as attack would create false positives. Both of these are undesirable. Visualization of the learning process may aid an operator in providing input in a supervised or semi-supervised learning mode. A technique for visualization of clustered file data to facilitate intrusion detection and behavior classification is discussed in detail below in connection with FIGS. 8-11. Processing continues to 712, where processing ends.

Figure 8:
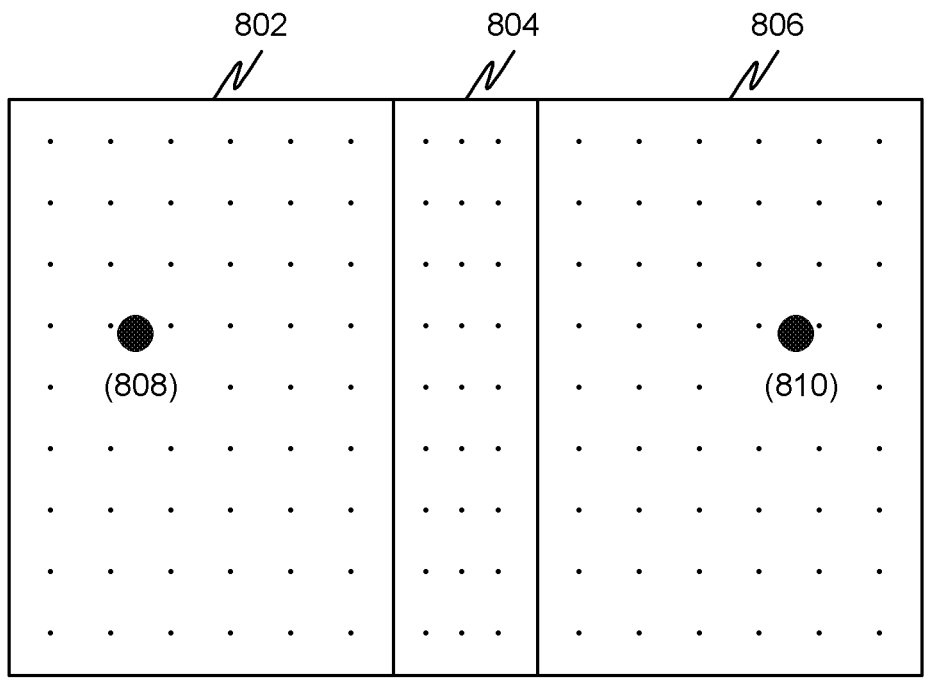
FIGS. 8-11 are diagrams showing plots of clustered file data in accordance with the present disclosure.

FIGS. 8-11 are diagrams showing plots of clustered data. FIG. 8 shows a two dimensional plot 800 of data grouped into a normal cluster 802, a training data region 804 and an attack cluster 806. The normal cluster has a center 808 and the attack cluster has a center 810. The normal and attack model clusters can be formed through unsupervised clustering of a data set containing both normal and attack traffic, or through supervised learning of individual test sets.

Figure 9:
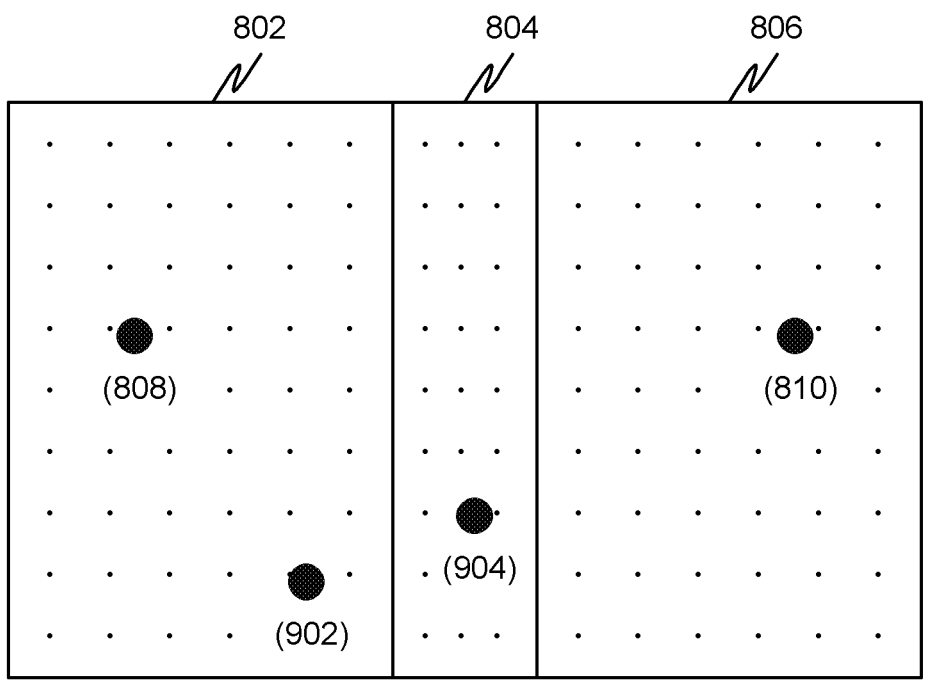
Figure 10:
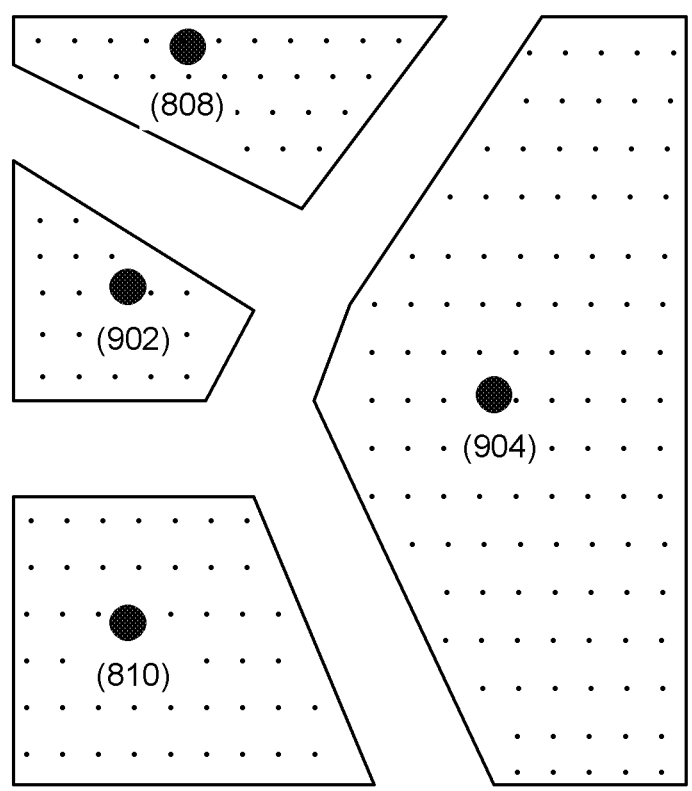

When new network traffic data is encountered, the new data can be tested against the two models to generate a new plot shown in FIG. 9, which shows a new normal behavior (902) and a new possible attack behavior (904). In practice, the cluster and data plot visualization could utilize color to assist an operator in more readily understanding a situation. For example, normal behavior clusters could be shown in green, attack clusters could be shown in red and training data (or unknown, indeterminate or new behavior data) regions can be shown in yellow. The operator could then focus attention on those new behaviors that are plotting in the "yellow region" to determine whether these new behaviors represent a new attack (e.g., a polymorphic or zero day attack).

Figure 11:
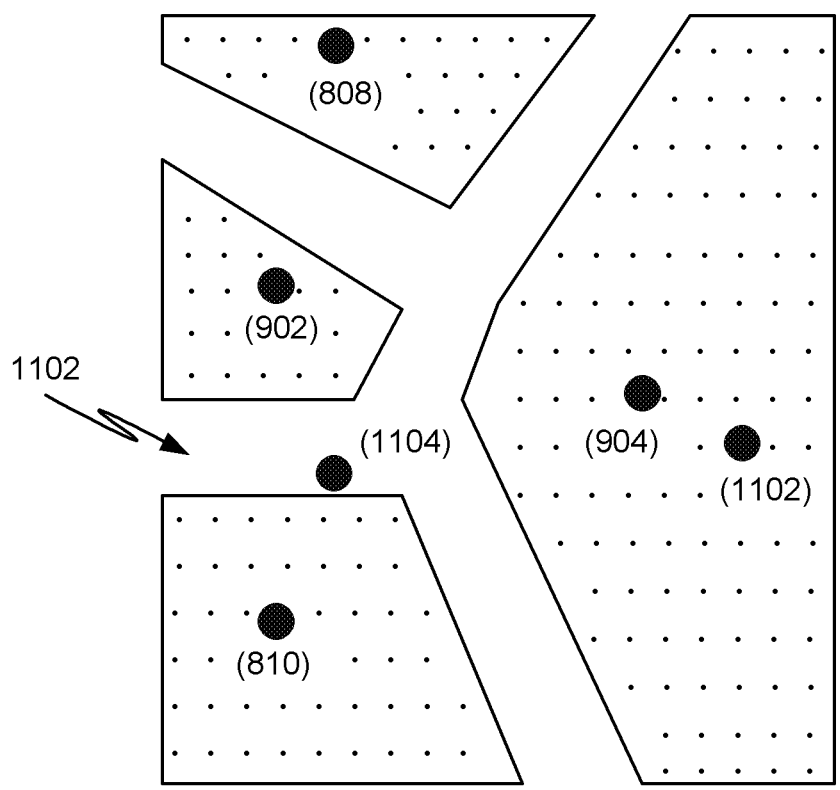

Based on the new data plotted in FIG. 9, the new behaviors can be added to the model base and the data sets reconfigured (e.g., clusters recomputed) based on the new models. The new models result in a data plot shown in FIG. 10 in which the new normal behavior model (902) has its own cluster and the new attack behavior model (904) has its own cluster to effectively form a four dimensional model space New traffic can then be plotted on the new model space, as shown in FIG. 11. As mentioned above, operators or experts analyzing the network traffic can focus attention on data that plots in the yellow region as this data may benefit from analysis to determine whether the data represents a polymorphic attack, a zero day attack or new normal behavior. For example, new behavior data 1102 is plotting in the cluster of attack behavior 904 and would thus be classified as an attack behavior. Moreover, the closer a new behavior plots to the center point of a cluster, the higher confidence the system can assign to the classification. On the other hand, new data 1104 is plotting outside of the four clusters (i.e., in region 1102, or what would be the "yellow region" if the plot were rendered in color) and would therefore be a candidate for analysis to determine what type of activity the new data represents.

The analysis can be performed by a human operator. Alternatively, in situations where choosing incorrectly between normal or attack classifications may not be catastrophic, the system could automatically classify the new behavior as a normal behavior or attack behavior and adjust the classification later based on additional information collected or based on a operator adjustment to the classification. The system could perform automatic classification in real time and then present the classification and data supporting the classification to an operator for non-real time analysis.

It will be appreciated that the modules, processes, systems, and sections described above can be implemented in hardware, hardware programmed by software, software instructions stored on a nontransitory computer readable medium or a combination of the above. A system for network intrusion detection using MDL clustering, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the computer programming and network security arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, computer systems, methods and software for network intrusion detection using MDL clustering.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A network intrusion detection system comprising:
a processor coupled to a nontransitory computer readable medium bearing software instructions that, when executed by the processor, cause the processor to perform operations including:
clustering raw network traffic files into a plurality of natural clusters based on minimum description length (MDL) similarity;
building an MDL model for each natural cluster;
calculating distances from each traffic file to each MDL model to obtain a distance vector for each traffic file, each distance vector having a distance from a corresponding traffic file to each MDL model;
clustering labeled network traffic data into a plurality of trained clusters;
selecting features of the plurality of natural clusters and the plurality of trained clusters for use in classification of network traffic;
building a decision model based on the distance vectors and the selected features of the plurality of natural clusters and the plurality of trained clusters;
analyzing network traffic using the decision model;
generating an output based on the analyzing, the output indicating potential matches between network traffic and an MDL model corresponding to malicious activity; and
displaying on a display, a visualization plot based on the output, the plot showing a graphical representation of network traffic distance from the plurality of natural clusters.

2. The system of claim 1, wherein the network traffic files include data corresponding to normal network behaviors.

3. The system of claim 1, wherein the network traffic files include data corresponding to both normal and malicious network behaviors.

4. The system of claim 1, wherein building the MDL model for each cluster includes concatenating all files in the cluster into a single string.

5. The system of claim 1, wherein the decision model is a minimum-distance classifier.

6. The system of claim 1, wherein the decision model is a support vector machine.

7. The system of claim 1, wherein the clustering raw network traffic files includes:
generating a pair-wise similarity matrix using MDL models to calculate a distance value between pairs of traffic files;
applying hierarchical clustering to the similarity matrix to generate a set of clusters;
refining the set of clusters; and
pruning the set of clusters.

8. The system of claim 7, wherein the clustering raw network traffic files includes iteratively performing the applying, refining and pruning steps.

9. A computerized method for computer network intrusion detection, the method comprising:
clustering, with a processor programmed to perform network intrusion detection, raw network traffic files into a plurality of natural clusters based on minimum description length (MDL) similarity;
building, with the processor, an MDL model for each natural cluster;
calculating, with the processor, distances from each traffic file to each MDL model to obtain a distance vector for each traffic file, each distance vector having a distance from a corresponding traffic file to each MDL model;
clustering labeled network traffic data into a plurality of trained clusters;
selecting features of the plurality of natural clusters and the plurality of trained clusters for use in classification of network traffic; and
building, with the processor, a decision model based on the distance vectors and the selected features of the plurality of natural clusters and the plurality of trained clusters.

10. The method of claim 9, further comprising:
analyzing, with the processor, network traffic using the decision model; and
generating, with the processor, an output based on the analyzing, the output indicating potential matches between network traffic and an MDL model corresponding to malicious activity.

11. The method of claim 9, wherein the clustering raw network traffic files includes:
generating a pair-wise similarity matrix using MDL models to calculate a distance value between pairs of traffic files;
applying hierarchical clustering to the similarity matrix to generate a set of clusters; refining the set of clusters; and pruning the set of clusters.

12. The method of claim 9, wherein the network traffic files include data corresponding to normal network behaviors.

13. The method of claim 9, wherein the network traffic files include data corresponding to both normal and malicious network behaviors.

14. The method of claim 9, wherein building the MDL model for each natural cluster includes concatenating all files in the natural cluster into a single string.

15. The method of claim 9, further comprising displaying on a display, a visualization plot based on the output, the plot showing a graphical representation of network traffic distance from the plurality of natural clusters.

16. A nontransitory computer-readable medium having software instructions stored thereon that, when executed by a processor, cause the processor to perform operations comprising:
clustering raw network traffic files into a plurality of natural clusters based on minimum description length (MDL) similarity;
building an MDL model for each natural cluster;
calculating distances from each traffic file to each MDL model to obtain a distance vector for each traffic file, each distance vector having a distance from a corresponding traffic file to each MDL model;
clustering labeled network traffic data into a plurality of trained clusters;
selecting features of the plurality of natural clusters and the plurality of trained clusters for use in classification of network traffic; and
building a decision model based on the distance vectors and the selected features of the plurality of natural clusters and the plurality of trained clusters.

17. The nontransitory computer-readable medium of claim 16, wherein the operations further comprise:
analyzing network traffic using the decision model; and
generating an output based on the analyzing, the output indicating potential matches between network traffic and an MDL model corresponding to malicious activity.

18. The nontransitory computer-readable medium of claim 16, wherein the clustering raw network traffic files includes:
generating a pair-wise similarity matrix using MDL models to calculate a distance value between pairs of traffic files;
applying hierarchical clustering to the similarity matrix to generate a set of clusters;
refining the set of clusters; and
pruning the set of clusters.

19. The nontransitory computer-readable medium of claim 16, wherein the network traffic files include data corresponding to normal network behaviors.

20. The nontransitory computer-readable medium of claim 16, wherein the network traffic files include data corresponding to both normal and malicious network behaviors.

21. The nontransitory computer-readable medium of claim 16, wherein building the MDL model for each natural cluster includes concatenating all files in the natural cluster into a single string.

22. The nontransitory computer-readable medium of claim 16, wherein the operations further comprise:
displaying on a display, a visualization plot based on the output, the plot showing a graphical representation of network traffic distance from the plurality of natural clusters.

23. A computerized method for computer network intrusion detection, the method comprising:
analyzing, with a processor programmed to perform network intrusion detection, network traffic using a decision model, the decision model having been built by:
clustering raw network traffic files into a plurality of natural clusters based on minimum description length (MDL) similarity;
building an MDL model for each natural cluster;
calculating distances from each traffic file to each MDL model to obtain a distance vector for each traffic file, each distance vector having a distance from a corresponding traffic file to each MDL model;
clustering labeled network traffic data into a plurality of trained clusters;
selecting features of the plurality of natural clusters and the plurality of trained clusters for use in classification of network traffic; and
building a decision model based on the distance vectors and the selected features of the plurality of natural clusters and the plurality of trained clusters; and generating, with the processor, an output based on the analyzing, the output indicating potential matches between network traffic and an MDL model corresponding to malicious activity.

24. The method of claim 23, further comprising displaying on a display, a visualization plot based on the output, the plot showing a graphical representation of network traffic distance from the plurality of natural clusters.

* * * * *

UNITED STATES PATENT AND TRADEMARK OFFICE
CERTIFICATE OF CORRECTION

| | |
|---|---|
| PATENT NO. | : 9,106,689 B2 |
| APPLICATION NO. | : 13/102899 |
| DATED | : August 11, 2015 |
| INVENTOR(S) | : Eric Steinbrecher et al. |

Page 1 of 1

It is certified that error appears in the above-identified patent and that said Letters Patent is hereby corrected as shown below:

<u>On the Title Page:</u>

In Item (75), the sixth's inventor's name should read -- Weizhong Yang, Clifton Park, NY --.

Signed and Sealed this
Twenty-third Day of February, 2016

Michelle K. Lee
*Director of the United States Patent and Trademark Office*